United States Patent [19]

Martinez

[11] 4,249,519

[45] Feb. 10, 1981

[54] SOLAR COLLECTOR

[76] Inventor: Marco A. Martinez, 40 Eileen St., Watsonville, Calif. 95076

[21] Appl. No.: 30,534

[22] Filed: Apr. 16, 1979

[51] Int. Cl.³ .................................................. F24J 3/02
[52] U.S. Cl. .................................... 126/450; 126/444
[58] Field of Search ............... 126/450, 432, 448, 449, 126/447, 444

[56] References Cited

U.S. PATENT DOCUMENTS

| 4,111,188 | 9/1978 | Murphy, Jr. | 126/450 |
| 4,194,498 | 3/1980 | Mayerovitch | 126/450 |

Primary Examiner—James C. Yeung
Attorney, Agent, or Firm—Robert G. Slick

[57] ABSTRACT

A solar collector of generally improved design is provided wherein the collector element comprises a flat absorber plate formed of two sheets of a conductive metal treated in a bonding process under heat and pressure with portions of the sheets spaced in such a way as to provide a sinuous passage from one end of the collector to the other with flat portions of the plate between said passages. The collector has a double glazing over the absorber plate to provide an air space between the sheets of glass and between the glazing and the absorber plate. A feature of the invention is in the fabrication of the collector utilizing novel metal extruded frame members combined with wood frame members. This combination provides an effective means for sealing the elements against the weather and for holding the various elements in correct alignment as well as resisting loads of snow or sleet. The design of the bonded absorber plate insures that every molecule of water is treated in the same way and in a typical embodiment, the temperature is raised from 4° F. to 10° F. in each pass.

7 Claims, 6 Drawing Figures

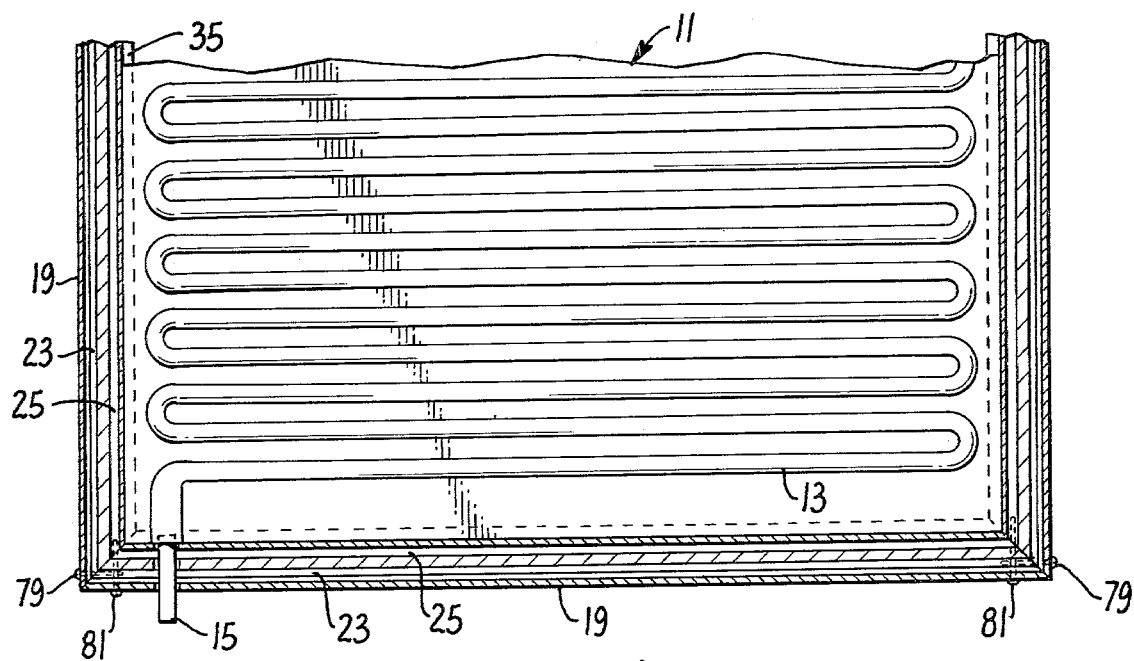
FIG. 4.
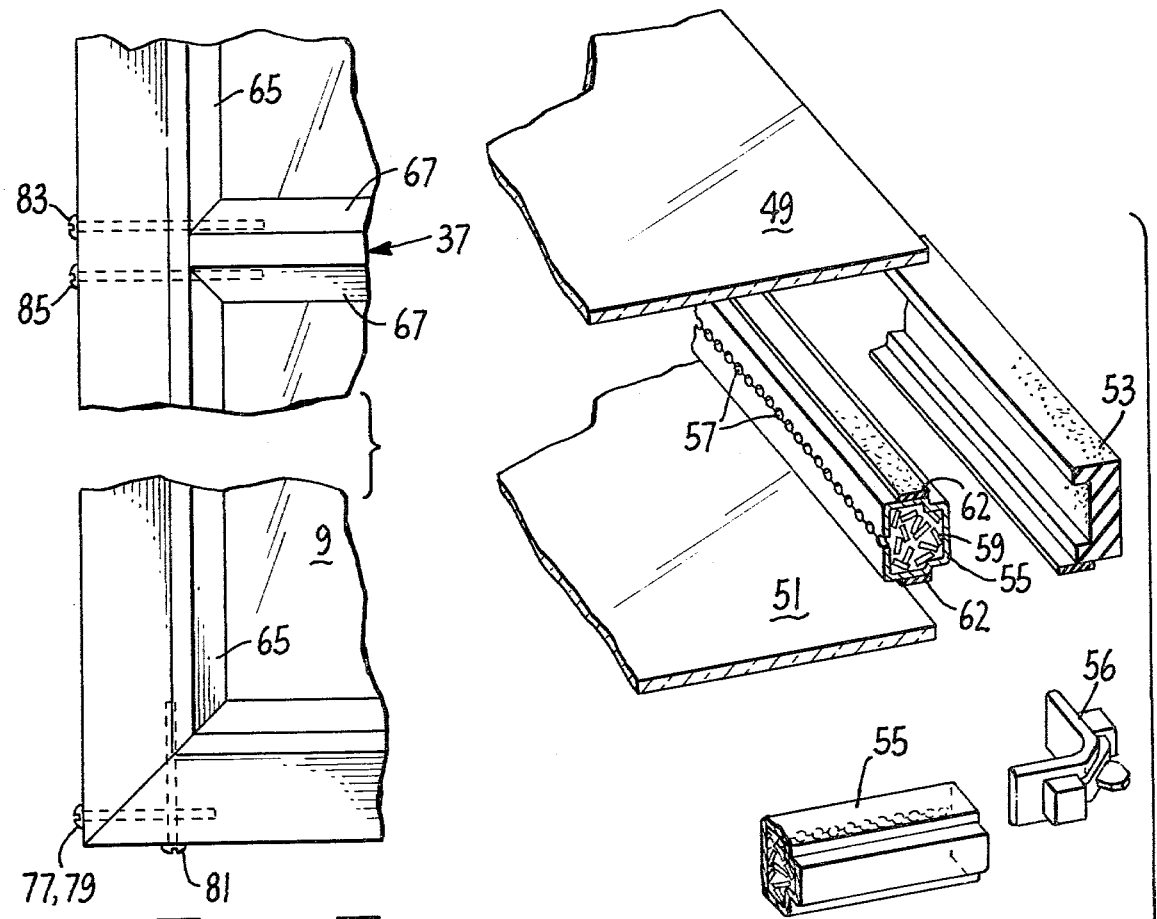
FIG. 5.
FIG. 6.

SOLAR COLLECTOR

SUMMARY OF THE INVENTION

At the present time there is much interest in solar energy and particularly means for heating a fluid, such as water, in solar collectors.

The solar collector of the present invention is constructed of sturdy members which not only provide efficient collecting elements but which can be readily sealed against the weather and are strong enough to support the elements of the nature such as snow.

One feature of the present invention is that the absorber element itself is formed of two bonded sheets of metal, such as copper, which are formed to provided a sinuous passage throughout the absorber with flat sections of the metal between the passages. Preferably, the flat plate is made of copper, although it can be made of other conductive material, so that a very efficient heat transfer exists between the passage portions and the flat portions between passages. The absorber is painted with a black coating for absorption purposes.

Another feature of the present invention is that the frame includes sturdy extrusion members, preferably of aluminum, which are combined with wood members to provide a frame which is light yet strong and which provides efficient means for holding the elements in the proper spaced relationship and also for sealing the elements from the weather.

The aluminum extrusions are provided with self-tapping screw passages so that it is very simple to provide for a strong corner section. They are also formed with fins for added strength.

The aluminum extrusions extend above the top of the glazing and have a lip thereon to provide a sealing element for the glazing.

Another feature of the invention is the provision of a hollow spacer element between the glazing elements wherein the hollow spacer has openings leading to the space between the glass sheets which form the glazing and wherein the spacer element contains a desiccant so that moisture is adsorbed, preventing condensation between the sheets of glass. The glazing permits the efficient use of the short wave lengths of sun light.

Various other features and advantages of the invention will be brought out in the balance of the specification.

BRIEF DESCRIPTION OF THE DRAWINGS

FIG. 4 is a partial plan view of the collector of the present invention showing a portion of the parts in section.

FIG. 5 is a fragmentary view showing a corner structure and a center structure and particularly how the structure is held together.

FIG. 6 is an exploded view of a corner showing the glazing elements as well as the spacing and edge elements of the glazing.

DESCRIPTION OF THE PREFERRED EMBODIMENTS

Figure 1:
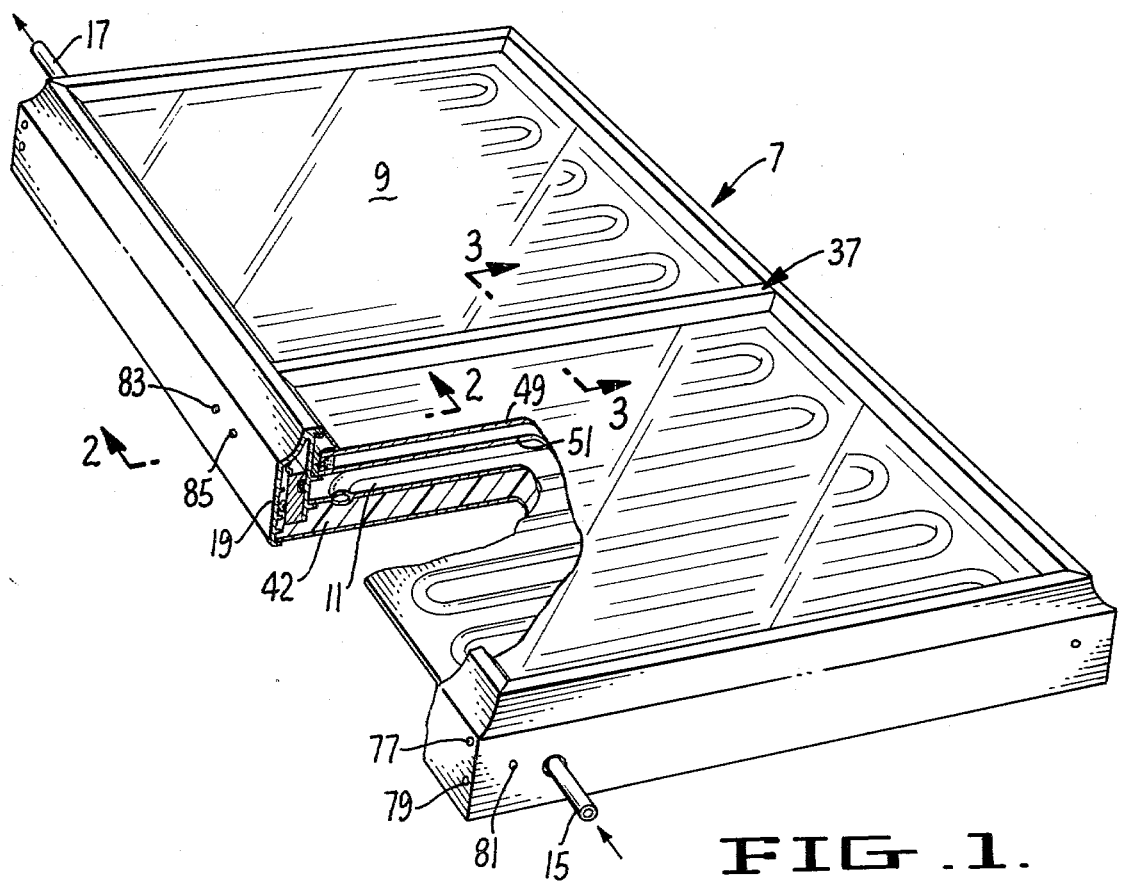
FIG. 1 is a perspective view, partly in section, showing a solar collector element embodying the present invention.

Referring now to the drawings by reference characters, there is shown a solar collector having a frame 7, a glazing element 9 and an absorber bonding plate 11, the latter having tubular passages therein, generally designated 13. The collector has an inlet for a fluid 15 and an outlet 17.

Figure 2:
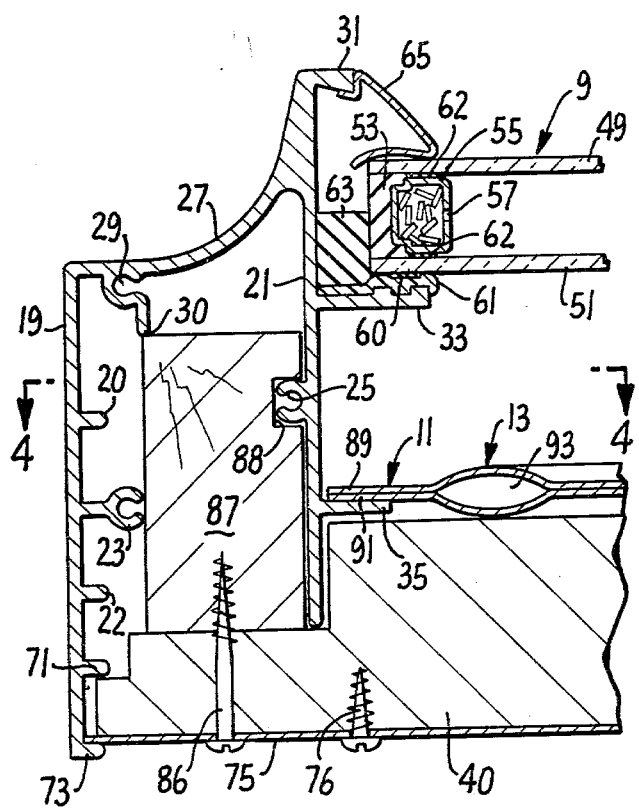
FIG. 2 is an enlarged section on the line 2—2 of FIG. 1.

The frame element 7 is made up of aluminum extrusions and wood members, and the combination of the these extrusions with wood members forms an important part of the present invention since they hold the various parts in spaced relationship and also provide for protection against the elements as well as providing ideal insulation. Further, they provide a strong structure to resist wind, snow and sleet. The particular shape of the frame extrusions can best be seen in FIG. 2 wherein the extrusion has an outer wall 19 and an inner wall 21 which are generally parallel to each other. The outer wall 19 has formed thereon a semicircular protrusion with hole 23, while the inner wall has a similar protrusion with hole 25. Wall 19 also has ribs 20, 22, 71 and 73 which strengthen the unit. The inner and outer walls are connected by a generally sloping top wall 27, and this is provided with a protrusion with semicircular hole 29 as well as terminating in rib 30. The holes 23, 25 and 29 serve to accept self-tapping screws which hold the frame together at the corners and center as is later described in detail. The protrusions in which the holes are formed also serve to retain the wood members. The inner wall 21 has a top lip 31, an intermediate lip 33 and a bottom lip 35.

Figure 3:
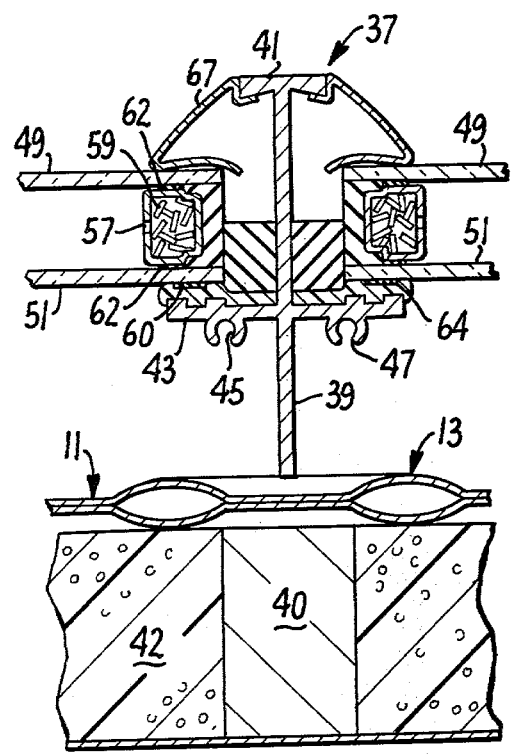
FIG. 3 is an enlarged section on the line 3—3 of FIG. 1.

Since the panels of the present invention are relatively large, typically 3 or 4 feet × 8 feet, it is desirable to provide a center metal extrusion 37 to avoid breaking the glasses, and this is shown in detail in FIG. 3. The center element 37 has a central rib 39, a top cap 41 and a bottom cross member 43. The bottom cross member has screw slots 45 and 47 formed therein as shown. This rests on the collector plate 11 and directly under this is the cross rib 40, suitably of wood, which forms a brace between the sections of foam insulation 42, later described.

The glazing element, generally designated 9, consists of an upper sheet 49 and a bottom sheet 51 of glass. For added strength sheet 49 is of extra strength glass and both sheets can be of this material, since such solar heaters are frequently used where there might be an accumulation of snow. At the edge a U-shaped member 53 of a soft plastic material and a hollow spacer element 55 hold the glasses in spaced relationship in a waterproof manner. The hollow spacing element 55 has a large inner section 56 and a reduced portion 58 and the U-shaped member 53 fits over the portion 58 and abuts on the section 56. Element 53 has openings 57 leading to the space between the two sheets of glass and the central portion is filled with a desiccant material generally designated 59. The corners are held by the angle member 56 which is crimped in place and sealed with silicon. Any desiccant material which is suitable for use as a dehydrating element such as silica gel or calcium chloride can be employed. The lower element rests on the edge 33 which is preferably protected by a piece of resilient material 61, such as rubber. Further, the joints between the U-shaped member and the glass are protected by the sealing members 60, 62 and 64, preferably of silicone rubber. At the side a spacer 63 is provided between the U-shaped element 53 and the sidewall 21 to hold the parts in proper spaced relationship and also to provide for expansion. At the top of the glazing is a spring steel element 65 which is sprung between the top sheet of glass 49 and the top lip 31 to form a substantially waterproof seal, to allow for expansion and to hold the parts in the proper relationship. A similar spring element 67 is employed at the center which again rests against the top glass 49 and clips against the top member 41 as is shown in FIG. 3. The whole collector is sealed in a waterproof manner with clear silicon sealant.

A wooden stringer 40 is provided to stiffen the collector plate 11 and lies between the ledge 35 and lips 71 and 73 on the sides. Ordinarily, several such cross stringers are employed to strengthen the structure. They are attached and held with screws 86 to the side member 87, and the space between the stringers is filled with the foam insulation 42. Preferably, the bottom is protected by means of a metal plate 75 held in place by a plurality of screws 76.

In order to form the corners, the extrusions which form the frame are cut at a 45° angle as is shown in FIG. 1 and the parts are held in a fixed relationship by means of self-tapping screws. Thus, at one corner the screws 77 and 79 pass through the openings 23 and 29, while a self-tapping screw 81 passes through the opening 25 of the other member. Thus, a very strong corner structure is provided. Further, the self-tapping screws are used to hold the center divider 37. Thus, the screws 83 and 85 pass through the holes 45 and 47 of the central divider.

In order to stiffen the structure, a side member 87 of wood is used within the hollow space between the walls 19 and 21 of the edge members. This combination of wood and metal forms a very stiff, strong structure and the wood provides additional insulation. The side member 87 is held firmly between the lip 30 and bottom cross strnger 40. Further, it has a groove 88 which fits around 25 and the opposite side of 87 engages 23.

The absorber plate proper is formed of an upper sheet 89 and a lower sheet 91 of a thermally conductive metal, preferably copper. Both sheets have been bonded under high pressure and high temperature and water can be frozen in the hollow passage without any damage to the absorber. A passage 93 is formed within the sheets so that the sheets consist of flat areas with passages therebetween. Since the metal of the plate is very conductive, efficient thermal conductivity is achieved. As can best be seen in FIG. 4, the passage 13 forms a sinuous path throughout the entire length of the collector. Thus the fluid which enters at one end traverses the entire length of the passage, resulting in the most efficient heat transfer to every molecule. This is in contrast with many other conductors wherein a manifold is provided on each side of the collector, the flow being in parallel from one side of the collector to the other at a high velocity so that the fluid doesn't have time and opportunity to become heated.

The solar collector of the present invention is light and strong. It will stand up under high winds, icing and heavy snow. It is so efficient it will collect heat even on overcast or foggy days.

Although various specific embodiments of the invention have been described, it will be understood that these are for illustration purposes only and that the invention is of broad applicability and that many departures can be made in the exact structure shown without departing from the spirit of this invention.

I claim:
1. A solar collecor comprising in combination:
   a. a generally flat absorber plate, said plate being formed of two bonded sheets of condutive metal with a sinuous fluid passage formed between portions thereof with flat portions between said passages;
   b. a double glazing of two sheets of glass over said plate to form a dead air space between said sheets and between said sheets and said flat plate, whereby a fluid such as water or air can flow into said passage at one end of said plate, through the entire length of said sinuous passage and out the other end of said plate;
   c. a frame made by combining metal extruded members with wood members surrounding said plate and extending above said plate, said metal exturded frame is provided with inwardly extending ledges including a first ledge to hold the flat plate, a second ledge to hold the bottom sheet of the glazing, a spacer (63) surrounding said glazing to hold said glazing and permit expansion and contraction and a top ledge spaced from the top of the top sheet, and a spring clip sprung between said top sheet and said ledge to provide a substantially weatherproof connection at the top of the collector, wherein said metal extruded frame having an outer wall and an inner wall, said wall being parallel to each other and spaced apart, said walls being connected together by a sloping top wall, sloping upward from the outer wall to the inner wall, and each wall having inwardly extending projections and a wooden frame member within said walls, said wooden member having a groove therein whereby said inner wall with the projection from the inner wall lying in said groove and said wooden member being held in spaced relationship to the top wall and the outer wall by the respective projections in said top and outside walls.

2. The solar collector of claim 1 which includes the following additional structure:
   a. at least some of the projections on the top, inner and outer walls of paragraph c include holes for the reception of self tapping screws,
   b. the metal extrusions of paragraph a are cut at a 45° angle to form a corner and
   c. self tapping screws extend through said outer walls at each side of a corner formed by said extrusions, each of said screws extending through an outer wall and into a hole of paragraph a hereof in the mating corner member.

3. The solar collector of claim 1 wherein the collector is divided in two sections with an extruded cross member separating the two sections, said cross member including an upright with a first pair of outwardly directed lips to retain said glazing and a second pair of outwardly extending lips to retain a spring clip sprung against the top of said glazing and a spacer (63) permitting expansion and contraction between said upright and said glazing.

4. The solar collector of claim 1 including the following additional structure:
   a. a plurality of wood stringers (40) extending from one side of the collector to the other, said stringers being located under said absorber plate,
   b. foam rubber insulation (42) between said stringers and c. a thin metal bottom plate (25) extending to the outer walls of paragraph a of claim 8 retaining said stringers and said bottom plate.

5. The structure of claim 1 wherein the flat absorber plate is made of two bonded copper sheets with a single continuous S-shaped or sinuous passage extending from one end of the collector to the other, whereby all fluid entering one end of the passage passes through the complete passage before discharge at the opposite end.

6. The solar collector of claim 1 wherein the two sheets of glass have a spacer extending at the edges thereof, said spacer being hollow and having openings extending into the space between the glasses, said hollow spacer having a dehydrating agent therein.

7. The structure of claim 1 wherein said metal extruded frame includes a plurality of screw holes whereby self-tapping screws can be passed through mating frame elements to hold the frame together.

* * * * *